United States Patent [19]
Morris

[11] Patent Number: 5,891,330
[45] Date of Patent: Apr. 6, 1999

[54] WASTE TREATMENT SYSTEM

[76] Inventor: Nathan Morris, 414 Kentmorr Rd., Stevensville, Md. 21666

[21] Appl. No.: 597,214

[22] Filed: Feb. 6, 1996

[51] Int. Cl.⁶ ........................................... C02F 1/02
[52] U.S. Cl. .................. 210/104; 210/138; 210/173; 210/179; 210/742; 210/744; 210/149; 4/320; 4/322; 4/222; 241/98; 422/106; 422/109
[58] Field of Search .............. 210/86, 173, 176, 210/179, 512.1, 104, 103, 138, 149, 742, 744, 175, 187, 194, 532.2; 4/319–322, 222; 241/98; 422/106, 108, 109

[56] References Cited

U.S. PATENT DOCUMENTS

| | | |
|---|---|---|
| 1,996,325 | 4/1935 | Cox . |
| 2,658,202 | 11/1953 | Wolman et al. . |
| 2,858,939 | 11/1958 | Corliss . |
| 2,951,251 | 10/1960 | Belden . |
| 3,044,077 | 7/1962 | Belden . |
| 3,318,248 | 5/1967 | Rembold . |
| 3,396,410 | 8/1968 | Gray . |
| 3,474,467 | 10/1969 | Stinson . |
| 3,510,000 | 5/1970 | Carlson . |
| 3,528,462 | 9/1970 | Quase . |
| 3,537,111 | 11/1970 | Whitten, Jr. . |
| 3,546,713 | 12/1970 | Gagne . |
| 3,597,769 | 8/1971 | Brainard . |
| 3,642,135 | 2/1972 | Borden . |
| 3,663,970 | 5/1972 | Drouhard, Jr. et al. . |
| 3,666,103 | 5/1972 | Green . |
| 3,669,592 | 6/1972 | Minchak . |
| 3,730,884 | 5/1973 | Burn et al. . |
| 3,733,617 | 5/1973 | Bennett . |
| 3,734,852 | 5/1973 | Borden . |
| 3,762,553 | 10/1973 | Reisso . |
| 3,820,488 | 6/1974 | Johnson . |
| 3,878,569 | 4/1975 | Peirish, Jr. et al. . |
| 3,922,976 | 12/1975 | Davis . |
| 3,933,636 | 1/1976 | Daniels . |
| 3,936,888 | 2/1976 | Sturtevant . |
| 3,951,803 | 4/1976 | Siegel . |
| 3,997,925 | 12/1976 | Hough . |
| 4,012,322 | 3/1977 | Saigh et al. . |
| 4,032,995 | 7/1977 | Kemper . |
| 4,092,248 | 5/1978 | Lamb . |
| 4,115,876 | 9/1978 | Cole, Jr. et al. . |
| 4,131,959 | 1/1979 | Albertassi et al. . |
| 4,133,058 | 1/1979 | Baker . |
| 4,161,792 | 7/1979 | Dallen et al. . |
| 4,324,007 | 4/1982 | Morris . |
| 4,347,142 | 8/1982 | Albertassi et al. . |
| 4,516,281 | 5/1985 | Macpherson et al. . |
| 5,006,232 | 4/1991 | Lidgitt et al. ......................... 210/104 |
| 5,433,842 | 7/1995 | Morris et al. . |

Primary Examiner—Robert J. Popovics
Attorney, Agent, or Firm—Dickstein Shapiro Morin & Oshinsky LLP

[57] ABSTRACT

A system for treating human waste in remote or portable toilet facilities, including a holding tank that stores waste; a heat reservoir that receives waste from the holding tank, heats the waste to kill fecal coliform bacteria therein present, and routes the heated bacteria-free waste back through the holding tank. The holding tank maintains the heated bacteria-free waste separate from the contaminated waste but passes residual heat from the bacteria-free waste to the untreated waste. In one embodiment, a centrifuge receives the bacteria-free waste from the holding tank, separates the liquid waste from the solid waste, and discharges the liquid waste from the system. In one embodiment, the waste is pumped through the system to be heated in incremental portions.

33 Claims, 7 Drawing Sheets

WASTE TREATMENT SYSTEM

BACKGROUND

The present invention relates to a waste treatment system, and more particularly to a waste treatment system for processing human waste on boats, recreational vehicles, and other remote toilet facilities where traditional sewers and septic systems are impractical or unavailable.

Waste treatment systems designed for use with toilets in remote or portable facilities such as in vehicles, aircraft, watercraft, and railroad cars must ultimately dump collected waste to another system or to the environment. In some known systems the waste is merely accumulated in large tanks and pumped off for processing elsewhere when the boat or other vehicle reaches a waste receiving station. See for example U.S. Pat. No. 4,324,007. However, it is desirable to discharge the waste into the environment when it is not practical to hold the amounts of waste that will accumulate before a collection station can be reached. But government regulations prohibit discharging of raw human bodily waste directly into the environment because the raw waste has bacteria, particularly fecal coliform bacteria, that may pose a health hazard in excess concentration.

For example, in the case of watercraft, federal regulations (33 C.F.R. § 159) require that human waste discharged into the water from boats in certain circumstances have a live fecal coliform bacteria count of not greater than 1,000 bacteria per 100 milliliters of discharge and no visible floating solids. Marine waste treatment systems that meet these standards are generally called "Type I" devices. In certain circumstances, the discharged waste, or "effluent," is required to have a fecal coliform bacteria count not greater than 200 parts per 100 milliliters and suspended solids not greater than 150 milligrams per liter. Marine waste systems that meet this standard are called "Type II" devices.

In other known systems, the raw waste is collected in a tank and treated in that tank prior to discharge of the tank contents to the environment. The tank can then accept more waste. See for example U.S. Pat. No. 5,433,842. Typically, these known types of waste treatment systems employ large holding tanks that receive raw waste directly from the toilets. The holding tanks include heaters that heat the collected waste to a temperature above about 155° Fahrenheit to kill fecal coliform bacteria. These known sewage treatment systems suffer from a disadvantage in that the holding tanks are very large, 40 gallons or more, and require a substantial amount of time and energy to heat the collected waste to a sufficient temperature to kill the fecal coliform bacteria. Moreover, as the waste in the tank is being heated, new waste piped in from the toilets cools the waste and causes further delays. If the tank fills before the water has rendered a sufficient temperature to kill the coliform bacteria, then the toilet cannot be used until the processing is finished. Moreover, placement of the large tank can be difficult in uses where there is limited space, such as on boats and other vehicles.

Accordingly, there is a need in the art for waste treatment systems for remote facilities that eliminate fecal coliform bacteria and visible solids from human waste in a manner which conserves space and energy resources.

SUMMARY

The present invention alleviates to a great extent the disadvantages of prior known systems by providing a remote waste treatment system that collects waste but heats and processes relatively small amounts of the waste at a time to kill fecal coliform bacteria.

In one aspect of the present invention, the waste treatment system includes a modular design to permit installation in cramped spaces typically found in mobile craft, such as boats. The system includes a holding tank and a heated holding reservoir. The waste is macerated in the holding tank. The system then pumps the waste through a conduit from the holding tank to the heat reservoir and heats the waste to kill coliform bacteria. Once heated, the waste may be discharged directly to the environment.

In another aspect of the present invention, the system routes the bacteria-free waste from the heat reservoir back through the holding tank. However, the heated waste remains separated from and does not mix with the untreated waste in the holding tank. The heated waste, when returned to the holding tank, is routed through a heat exchanger and allowed to cool. Heat from the heated waste transfers to and preheats the collected waste in the holding tank.

In another aspect of the invention, the waste is pumped through the heat reservoir in relatively small incremental amounts. Less time and energy is required to heat the incremental amount to a sufficient temperature to kill the bacteria.

In another aspect of the invention, the system may include a centrifuge that receives the cooled, bacteria-free waste from the holding tank and separates liquid waste from solid waste. The liquid waste is discharged from the system. The solid waste is collected for disposal later.

It is an object of the present invention to provide a waste treatment system designed for use with toilets when hooked up to typical sewage or septic facilities is impractical. Typical applications include, but are not limited to watercraft, aircraft, recreational vehicles and railroad toilet facilities.

It is another object of the present invention to provide a holding tank and heat reservoir assembly that subjects human waste to temperatures to kill fecal coliform bacteria substantially instantly.

It is a further object of the present invention to expose small amounts of human waste to bacteria killing temperatures without having to heat at once the entire body of human waste collected in the sewage treatment system.

It is still another object of the present invention to conserve energy within the sewage treatment system by transferring residual heat from waste that has been subjected to temperatures sufficient to eliminate fecal coliform bacteria therefrom to the aggregate collected human waste held in the system.

It is yet another object of the present invention to separate the solids from the bacteria free waste and discharge the liquids of the waste from the system.

The above objects, advantages and features of the invention are achieved using an open design that both avoids the use of valves and other small aperature structures that may become clogged upon use and avoids use of chlorine or other chemicals to kill the bacteria.

The above and other objects, advantages, and features of the invention will be more readily understood from the following detailed description of preferred embodiments of the invention which is provided in connection with the accompanying drawings.

DESCRIPTION OF PREFERRED EMBODIMENTS

Figure 1:
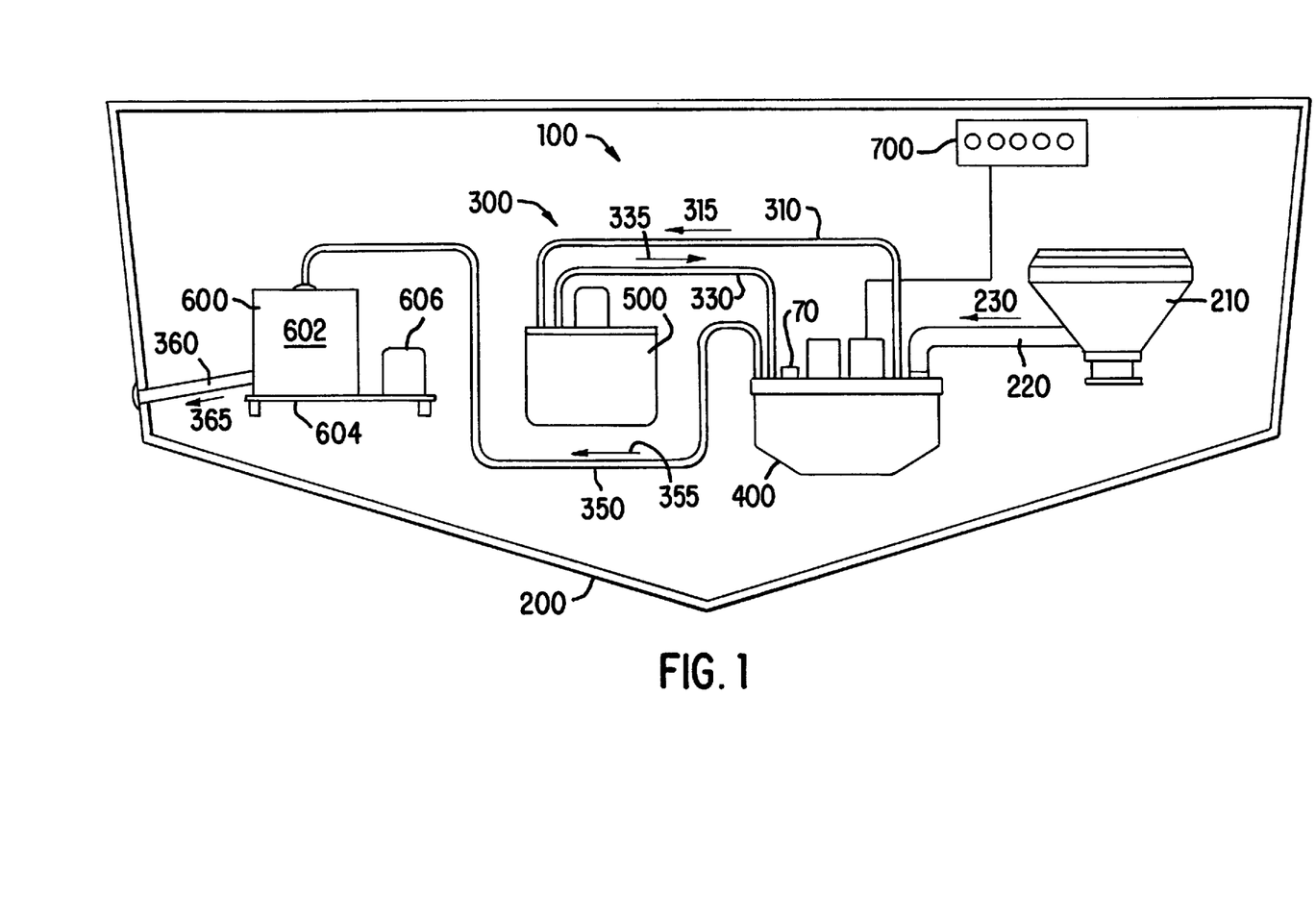
FIG. 1 is a schematic diagram of a waste treatment system according to a preferred embodiment of the present invention.

Refer now to FIG. 1, there being shown a waste treatment system, generally designated by reference numeral 100, according to a preferred embodiment of the present invention. The waste treatment system 100 is shown schematically in FIG. 1 in use on a boat 200. The system 100 includes a modular design adapted for flexible integration with the small spaces typically found on mobile craft, such as boats. The system 100 includes a toilet 210 connected by a waste pipe 220 to a holding tank 400.

Toilets provided in watercraft are well-known. Typically, as will be appreciated by those of skill in the art, the toilet 210 includes a piston (not shown) that macerates the waste sufficiently to permit the waste to travel freely in the direction of arrow 230 from the toilet 210 through the waste pipe 220 to the holding tank 400.

The waste is further macerated in the holding tank 400. From the holding tank 400, the waste is pumped through the system 100 through a closed conduit designated generally by reference numeral 300. The macerated waste is pumped in the direction of arrow 315 from the holding tank 400 to a heat reservoir 500 through a untreated waste tube 310. The waste at the heat reservoir 500 is contained within a heat exchanger tube 320 (FIG. 4) and heated to a temperature sufficient to kill fecal coliform bacteria present in the waste. The heated waste is pumped in the direction of arrow 335 from the heat reservoir 500 back to the holding tank 400 via a heated waste tube 330. Within the holding tank 400, a holding tank heat exchanger tube 340 (FIG. 2) maintains the heated "bacteria-free" waste separate from the untreated waste. The holding tank heat exchanger tube 340 allows heat to pass from the heated waste to the untreated waste, to cool the heated waste and to pre-heat the unheated waste. The cooled treated waste is then pumped out of the holding tank 400 via a cooled waste tube 350.

In the system shown in FIG. 1, the cooled waste tube 350 carries the pumped waste in the direction of arrow 355 to a centrifuge 600. The centrifuge 600 separates the liquids from the solids of waste. The solid waste is collected within the centrifuge 600, and the liquid waste is discharged from the system 100 through a discharge conduit 360 in the direction of arrow 365.

The untreated waste tube 310, the heated waste tube 330 and the cooled waste tube 350 are made of plastic, rubber or metal having an inside diameter of ⅜". The heat exchanger 320 or 340 tubes are made of monel or copper having an outer diameter of ⅜" copper.

The system 100 collects waste in a holding tank 400. Presently, either of two embodiments of the holding tank 400 may be used, shown in FIGS. 2 and 3 respectively. The two embodiments are identical to one another, differing only by the structure provided to blend waste and pump blended waste throughout the system 100. The macerator/injectors of the two embodiments are described first, followed by a description of the remainder of the holding tank 400.

Figure 2:
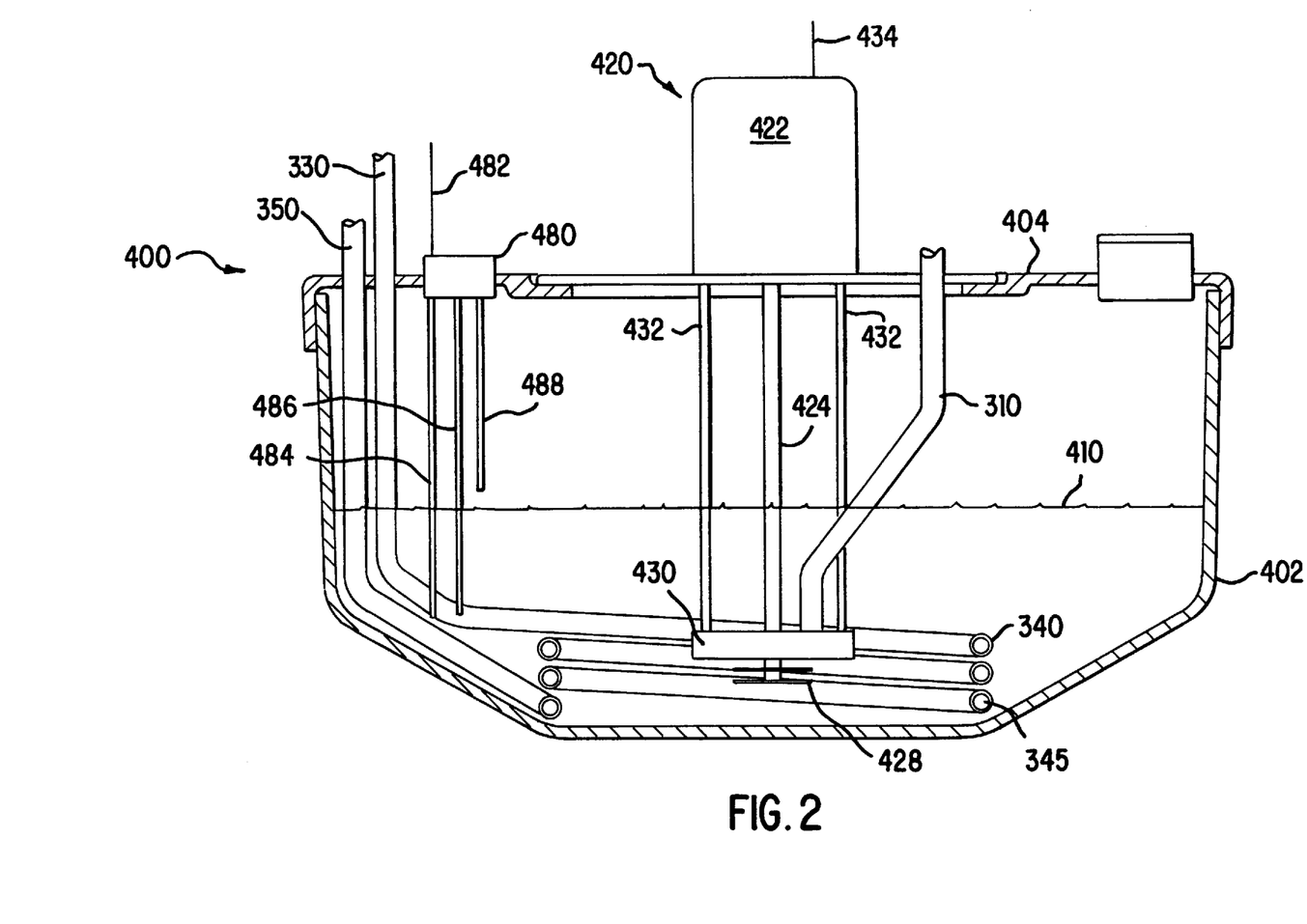
FIG. 2 is a cross-sectional view of one embodiment of the holding tank of the system of FIG. 1.

Refer now to FIG. 2 which shows the interior of the first embodiment of the holding tank 400. The holding tank 400 includes a holding tank housing 402 and a holding tank lid 404. Waste 410 is shown collecting at the bottom of the holding tank 410. In the first embodiment, the holding tank 400 includes a macerator pump unit 420 also shown in FIG. 2. The macerator injector unit 420 includes a motor 422 and macerator shaft 424 that extends into the holding tank 400. A macerator blade 426 and stirring blade 428 are provided at the end of the macerator shaft 424. Although waste 410 is typically macerated by conventional toilets, the stirring blade 428 and macerator blade 426 further blend the collected waste 410. A macerator pump housing 430 is provided next to the macerator blade 426, supported by one or more housing supports 432. An output of the macerator pump housing 430 is connected to the untreated waste tube 310. The macerator blade 426 also forces blended waste 410 into the untreated waste tube 310 and throughout the system as described above. The macerator pump unit 420 is turned on and off by the controller 700 (FIG. 1) over a macerator control line 434.

Figure 3:
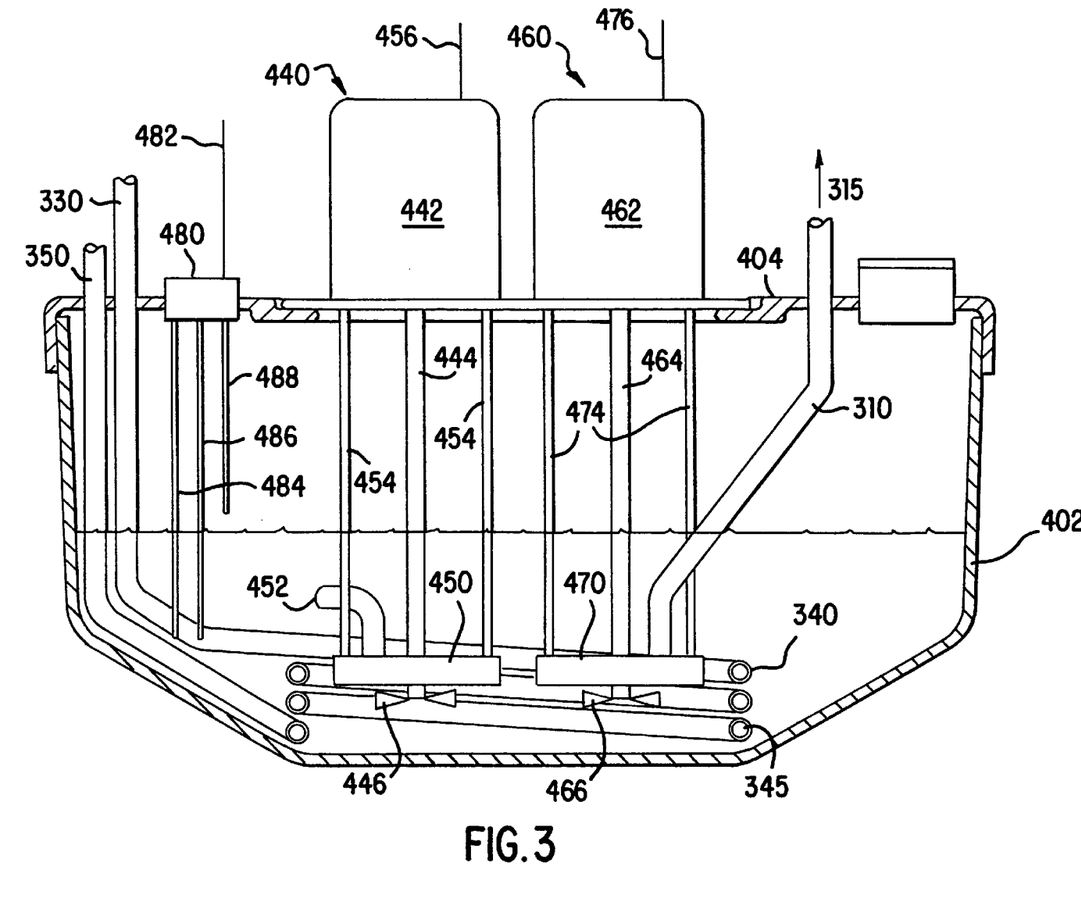
FIG. 3 is a cross-sectional view of a second embodiment of the holding tank of the system of FIG. 1.

In a second embodiment, shown in FIG. 3, the holding tank 400 includes a macerator unit 440 and injector pump unit 450. The macerator unit 440 is mounted on holding tank lid 404. The macerator pump unit 440 includes a macerator motor 442 and a macerator shaft 444 extending from the macerator motor 442 into the holding tank 400. A macerator blade 446 is provided at the end of the macerator shaft 444.

A macerator pump housing 450 is provided adjacent to the macerator blade 446 along an axis of the macerator shaft 444. The macerator blade 446 and macerator pump housing 450 blends the collected waste 410 to a uniform consistency and circulates the blended waste 410 through an interior of the holding tank 400 via a macerator pump outlet 452. The solids are reduced to acceptable size, typically smaller than can be discerned with the naked eye. The macerator pump housing 450 is supported by two or more pump supports 454. The macerator unit 440 is turned on and off by the controller 700 over a macerator control line 456.

The second embodiment of the holding tank 400 is provided with an injector pump unit 460. The injector pump unit 460 includes an injector pump motor 462, an injector pump shaft 464 and an injector pump blade 466 which, preferably, are identical to the macerator motor 442, macerator shaft 444 and macerator pump blade 446 described above.

The injector pump unit 460 also includes an injector pump housing 470 which is similar to the macerator pump housing 450 described above. However, an output of the injector pump housing 470 is connected to the untreated waste tube 310. The injector pump housing 470 is supported by two or more pump supports 474. The injector pump unit 460 pumps the waste 410 through the untreated waste tube 310 to the heat reservoir 500, shown in FIG. 1. The controller 700 turns the injector pump unit 460 on and off via the injector pump control line 476 as described below.

Preferably, the macerator pump unit 420 of the first embodiment of the holding tank 400 and the macerator unit 440, and the injector pump unit 460 of the second embodiment of the holding tank 400 are off-the-shelf products of the Groco Company, Hanover, Md., Model Nos. MPT-600, MPT-720, MPS-600 or MPS-720.

The capacity of the holding tank 400 should be determined considering the likely peak usage of the toilets and the rate at which the system will process the waste 410. In a preferred embodiment, the holding tank 400 holds from eight to forty (40) gallons of waste 410.

The following discussion is common to the first and second embodiment of the holding tank 400.

The waste pipe 220 extends through an opening of the holding tank lid 404 and deposits waste 410 into the holding tank 400. The waste 410 is shown collecting in a bottom of the holding tank 400.

The holding tank housing 402 is provided with a substantially cylindrical configuration when viewed from above. The cylindrical configuration eliminates corners that characterize rectangular holding tanks. Waste tends to collect in corners of rectangular holding tanks and is hard to clean. The walls of the holding tank housing 402 taper inward toward the bottom of the holding tank 400 as shown in either FIG. 2 or 3. The tapered configuration of the holding tank housing 402 minimizes the volume of residual waste below the inlets of pump 420 in the first embodiment of the holding tank 400 or pumps 440 and 460 in the second embodiment of the holding tank 400. In either embodiment, it is important to place the pump inlets as close to the bottom of the housing 402 as possible to minimize the quantity of residual waste 410 left in the holding tank 400 after waste processing.

The holding tank 400 is provided with a level sensor 480 mounted on the holding tank lid 404. The level sensor 480 detects a quantity of waste 410 in the holding tank 400 and provides control signals to the controller 700 over level sensor control lines 482. The level sensor 480 includes three probes that extend in parallel from the holding tank lid 404 into the interior of the holding tank 400. A first probe 484 provides an electrical ground. Probe 484 extends at least to a low level threshold. The second probe is a low level sensor 486 which extends only to the low level threshold. The third probe is a high level sensor 488 which extends to the high level threshold. Electric potentials are provided to the low level sensor 486 and to the high level sensor 488. When waste 410 is brought into contact with either low level sensor 486 or high level sensor 488 through the waste 410 creates an electric connection between the respective sensor 486 or 488 and the probe 484. For example, in the situation shown in FIG. 2 where the waste 410 is in contact with the probe 474 and the low level sensor 486, electric current flows from the low level sensor 486 through the waste 410 and to the probe 484. By sensing current flow through the low level sensor 486 and/or high level sensor 488 over one or more level sensor lines 482, the controller 700 determines whether to activate pump 420 or 460.

In an alternate embodiment of the level sensor 480, the system 100 provides the probe 484 with an electric potential and grounds low level sensor 486 and high level sensor 488. In this embodiment, the controller 700 measures current flow through the low level sensor 486 and the high level sensor 488 to determine the quantity of waste 410 in the holding tank 400.

Other features of the holding tank 400 are described following a discussion of the heat reservoir 500 provided below.

The system 100 may employ either of two embodiments of the heat reservoir 500. The first embodiment uses a solid core. The second embodiment is constructed as a tank. The two embodiments are described below.

Figure 4:
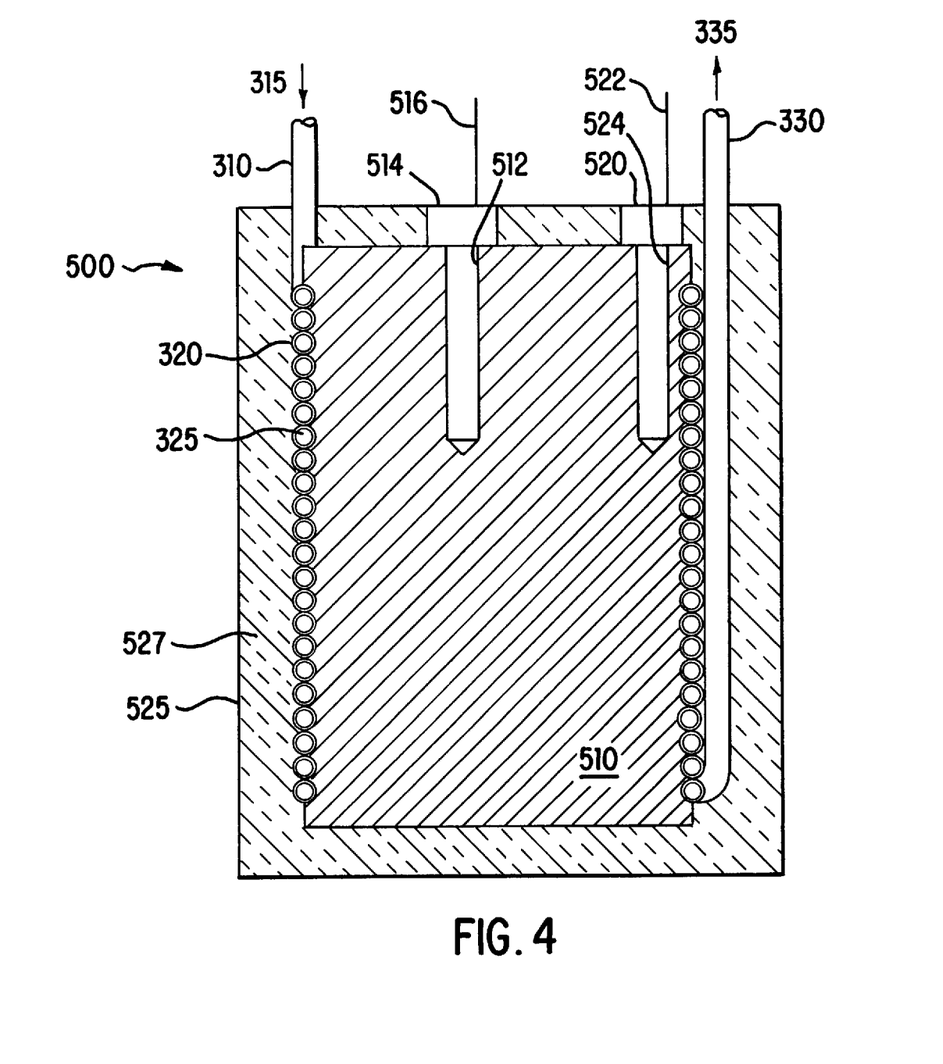
FIG. 4 is a cross-sectional view of one embodiment of the heat reservoir of the system of FIG. 1.

The first embodiment of the heat reservoir 500 is shown in FIG. 4. The solid heat reservoir 500 includes a heat exchanger tube 320 wrapped around a solid billet 510. The circumference of the billet 510 is provided with a threaded groove sized to receive the heat exchanger tube 320. The heat exchanger tube 320 and billet 510 are contained in a heat reservoir housing 525 filled with an insulator 527 such as vermiculite, cedar chips, sawdust, or fiberglass.

The billet 510 is made of a thermal conductor such as aluminum. The billet 510, in a preferred embodiment, is approximately 6 inches in diameter, although the diameter may be varied to suit any design criteria.

Those of skill will appreciate that conductivity of heat through adjacent structures is impaired if gaps exist between the two structures. Accordingly, it becomes important to ensure good contact between the heat exchanger tube 320 and the billet 510. To ensure adequate contact, the heat exchanger tube 320 is forced against the billet 510 during construction. By wrapping the heat exchanger tube 320 around the billet 510 during construction, for example, by hammering, the heat exchanger tube 320 is forced out of round and provides an interference fit against the grooves of the billet 510. Proper contact between the heat exchanger 320 and billet 510 is maintained by a plurality of hose clamps (not shown) that wrap over the circumference of the billet 510 and heat exchanger 320 assembly.

The solid heat reservoir 500 is provided with one or more heater wells 512. A heater 514 is provided within each heater well 512. If only one heater 514 is provided, it is placed along the center axis of the billet 510. Additional heaters 514 are disposed uniformly over the cross-sectional area of the billet 510. The heaters 514 are controlled by the controller 700 over control line 516.

The billet 510 is also provided with a thermostat well 524. The thermostat well 524 houses a thermostat 520 that measures the temperature of the billet 510 and sends temperature data to the controller 700 over control line 522.

Figure 5:
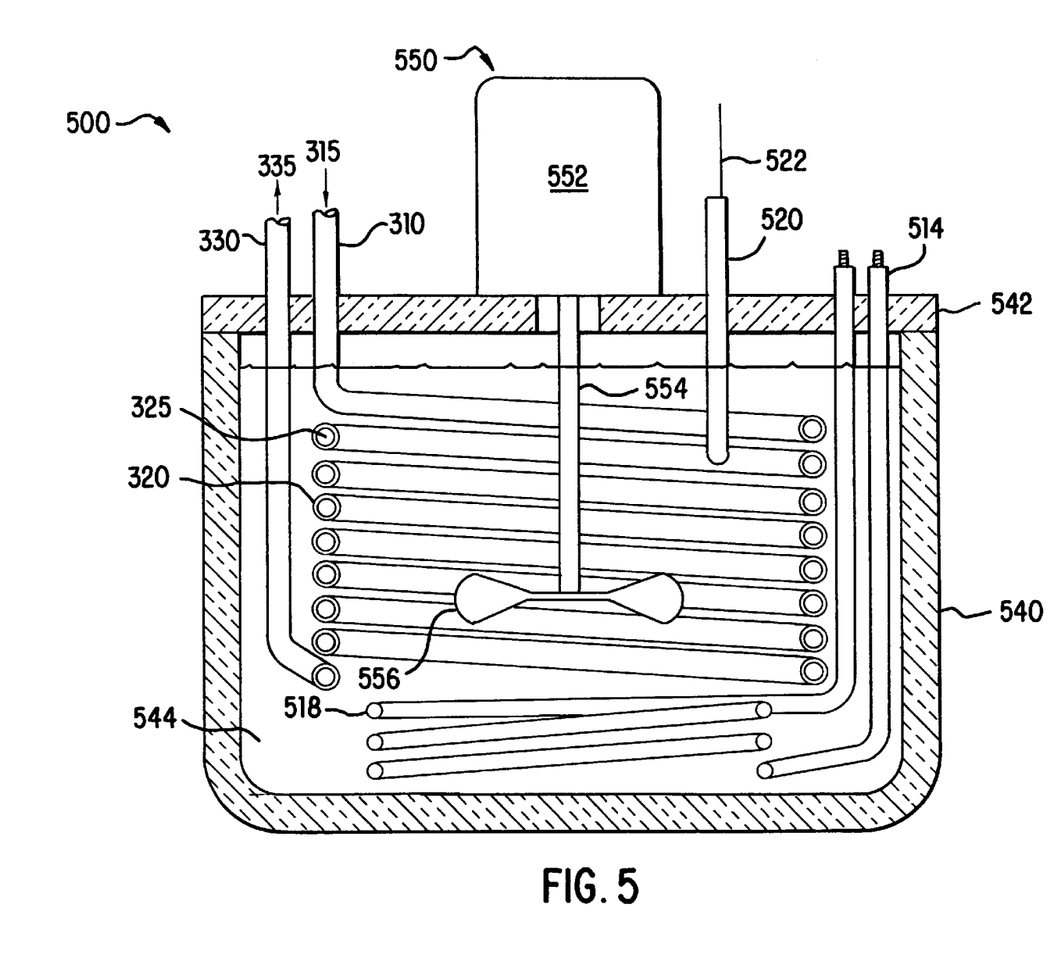
FIG. 5 is a cross-sectional view of a second embodiment of the heat reservoir of the system of FIG. 1.

A second embodiment of the heat reservoir 500 is shown in FIG. 5. This second embodiment is a tank that is enclosed by a heat reservoir housing 540 and a heat reservoir lid 542. Preferably, the heat reservoir housing 540 and the heat reservoir lid 542 are composed of a thermal insulator or wrapped with an insulator such as, for example, vermiculite, cedar chips, sawdust, sheet fiberglass, or foam. The heat reservoir 500 is filled with a liquid, such as oil 544, capable of holding heat up to 200° F. In a preferred embodiment, vegetable oil is used because it imposes no known adverse environmental impacts if the oil 544 were to spill inadvertently into the environment. However, the present invention need not be limited to vegetable oil, as commercial oils, lubricants, or water may be used, depending upon criteria.

A heater 514 extends into the oil 544 from the heat reservoir lid 542. Preferably, the heater 514 terminates in a heater coil 518 that coils co-axially with the heat exchanger 320. The heater 514 is preferably a 1500 watt heater.

The second embodiment of the heat reservoir 500 is provided with an agitator 550 that circulates the oil 544 through the heat reservoir 500. The agitator 550 ensures that the oil temperature is uniform. Oil 544 circulates over the heat exchanger 320 and the heater 514. The agitator 550 includes a stir motor 552 mounted on the heat reservoir lid 542. A stir shaft 554 extends from the stir motor 552 into the oil 500. A stir blade 556 is mounted on the stir shaft 554. The stir shaft 554 is placed along a center axis of the heat reservoir exchanger 320. Preferably, all motors 422, 442, 462 and 552 used by the system 100 are sparkless.

The tank embodiment of the heat reservoir 500 also includes a thermostat 520 to measure the temperature of the oil 544. The thermostat 520 transmits temperature control signals to the controller 700 over the thermostat control lines 522. The controller 700, shown in FIG. 1, controls the heat output of the heater 514 in response to the temperature control signals generated by the thermostat 520 over control lines 522.

Regardless of which embodiment of the heat reservoir 500 is used, the heat reservoir heats waste in the heat exchanger tube 320 to a temperature sufficient to kill any fecal coliform bacteria present in the waste. Throughout the remainder of the discussion, reference will be made to the temperature of the heat reservoir 500. It should be appreciated that the temperature of the heat reservoir 500 includes the temperature of the billet 510 or the temperature of the oil 544, as sensed by the thermostat 520, depending on which embodiment is used.

The untreated waste tube 310 carries untreated waste from the holding tank 400 to the heat reservoir 500. The untreated waste tube 310 couples to a heat reservoir heat exchanger 320. Waste 325 in the heat reservoir heat exchanger 320 is heated to a range between 165°–175° F. Experimental evidence suggests that fecal coliform bacteria present in waste is eliminated substantially instantly at temperatures above 155° F. After the bacteria is killed, the waste 325 exits from the heat reservoir heat exchanger 320 via heated waste tube 330. In a preferred embodiment, the heat reservoir heat exchanger 320 is made of copper or monel, possesses an outer diameter of ⅜" and a length of approximately 30 feet.

Control of the flow of waste 325 through the heat exchanger tube 320 may be accomplished in a variety of ways. The waste 325 may be processed on a continuous basis. Or, a predetermined incremental amount of waste 325 may be pumped through the system 100, and during a waiting period, the waste 325 in the heat exchanger 320 (about eight fluid ounces in the embodiment of FIG. 1) is heated and the waste within conduit 300 is not pumped. After the waiting time period, another incremental amount is pumped into the heat exchanger tube 320, moving the waste 325 in front of it through the conduit 300 towards the holding tank 400 and the centrifuge 600. In each case, the flow of waste is maintained at a rate that ensures that the waste 325 remains in the heat reservoir heat exchanger 320 for a time sufficient to bring the temperature of the waste 325 to within the desired 165°–175° F. range. The flow may be slowed or stopped by the controller 700 to ensure that sufficient heating of the waste 325 is occurring to kill the bacteria.

In a preferred embodiment, the controller 700 maintains the temperature of the heat reservoir 500 at a temperature not lower than 165° F. and not greater than 175° F. In this embodiment, fecal coliform bacteria in the waste 325 will be killed almost instantly as it passes through the heat exchanger tube 320.

Raising the waste 325 to a temperature of about 165°–175° F. quickly kills substantially all fecal coliform bacteria in the waste. The fecal coliform bacteria will be killed at lower temperatures, 155° F. being generally considered as an approximate low-end kill temperature. However, raising the temperature of the waste 325 to the preferred range promotes killing of the fecal coliform bacteria quickly, within seconds or less. Also, a higher temperature could be used. However, this would increase power consumed by the system 100 without appreciable performance benefits.

Bacteria-free waste from the heat reservoir 500 is returned to the holding tank 400 via the heated waste tube 330. The bacteria-free waste retains heat from the heating process performed in the heat reservoir 500. As shown in FIGS. 2 and 3, the holding tank 400 provides a holding tank heat exchanger 340 coupled to the heated waste tube 330. Residual heat in the bacteria-free waste 345 is transferred to the untreated waste 410 in the holding tank 400. However, the bacteria-free waste 345 in the holding tank heat exchanger 340 does not physically mix with the untreated waste 410. Rather, the bacteria-free waste 345 remains in the holding tank heat exchanger 340. The holding tank heat exchanger 340 is connected to the cooled waste tube 350. The cooled waste tube 350 carries the cooled, bacteria-free waste to a centrifuge 600.

The centrifuge 600, shown in FIG. 1, separates solid elements from liquid elements in the treated waste. The centrifuge includes a centrifuge housing 602 mounted on a bench 604. A centrifuge motor 606, also mounted on the bench 604, provides rotational drive for the centrifuge 600 via a belt and pulley (not shown). Cooled waste enters the centrifuge 600 through the cooled waste tube 350. After liquid waste is separated from solid waste elements of the cooled waste, the liquid waste is discharged from the centrifuge 600 via a discharge tube 360 in a direction indicated by arrow 365. The discharge tube 360 is connected to an external shell of the structure housing the system 100, such as boat hull 200.

Figure 6:
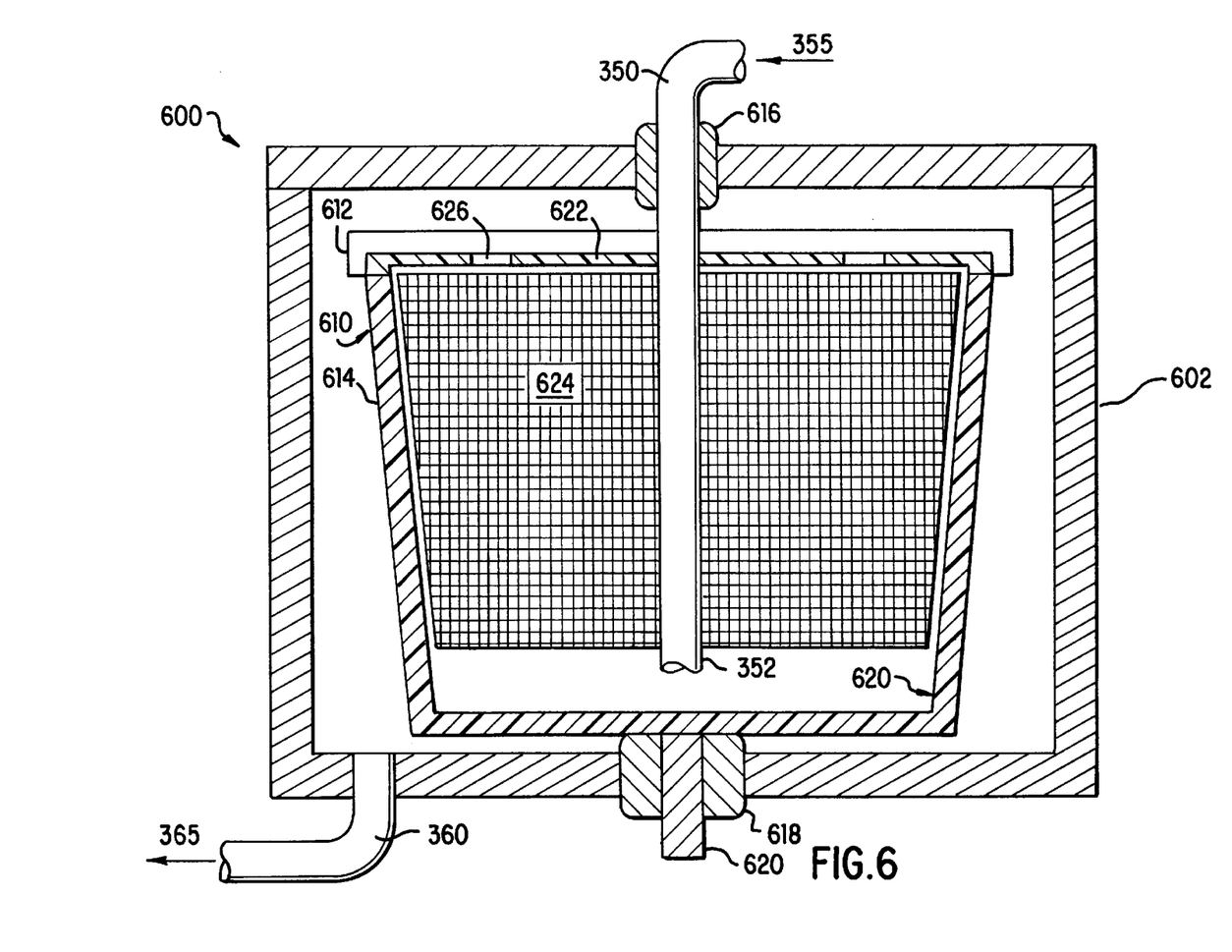
FIG. 6 is a view of the interior of the centrifuge of the system of FIG. 1.

Shown in FIG. 6, a centrifugal drum 610 is provided within the centrifuge housing 602. A drum lid 612 and a drum body 614 enclose the centrifugal drum 610. The centrifugal drum 610 is pivotally mounted within the centrifuge housing 602 by bearings 616 and 618. A spindle 620 provided within the drive bearing 618 is coupled to the centrifuge motor 606 shown in FIG. 1. Thus, drive from the centrifuge motor 606 spins the centrifugal drum 610.

A centrifuge bucket 620 is provided within the centrifugal drum 610 and is enclosed by a bucket lid 622. The drum lid 612 engages the bucket lid 622, thus transferring rotational drive to bucket 620. Walls of the centrifuge bucket 620 are tapered; the diameter of the centrifuge bucket 620 decreases along the depth of the centrifuge bucket 620. A screen 624 is provided over the interior circumference of the centrifuge bucket 620. A plurality of holes 626 are provided over a surface of the bucket lid 622 at a uniform radial distance from the lid's 622 center. Similarly, the drum lid 612 is provided with a plurality of openings (not shown) disposed at a uniform radial distance from the lid's 612 center. A waste tube 352, pivotally connected to an end of the cooled waste tube 350, extends into the interior of the centrifuge bucket 620.

During operation of the centrifuge 600, cooled waste enters the centrifuge bucket 620 through the waste tube 352. The centrifuge motor 606 drives the centrifugal drum 610 at a speed sufficient to force the collected waste to the outer sides of the centrifuge bucket 620 by centripetal force. In the described embodiment, the centrifuge motor 606 is a ¼ horsepower motor and drives the centrifugal drum 610 approximately 2,800 revolutions per minute or at a speed sufficient to separate solid elements of the waste from liquid elements of the waste. It should be appreciated that in certain applications, having larger waste outputs, the centrifuge drive motor 606 may be larger.

Figure 7:
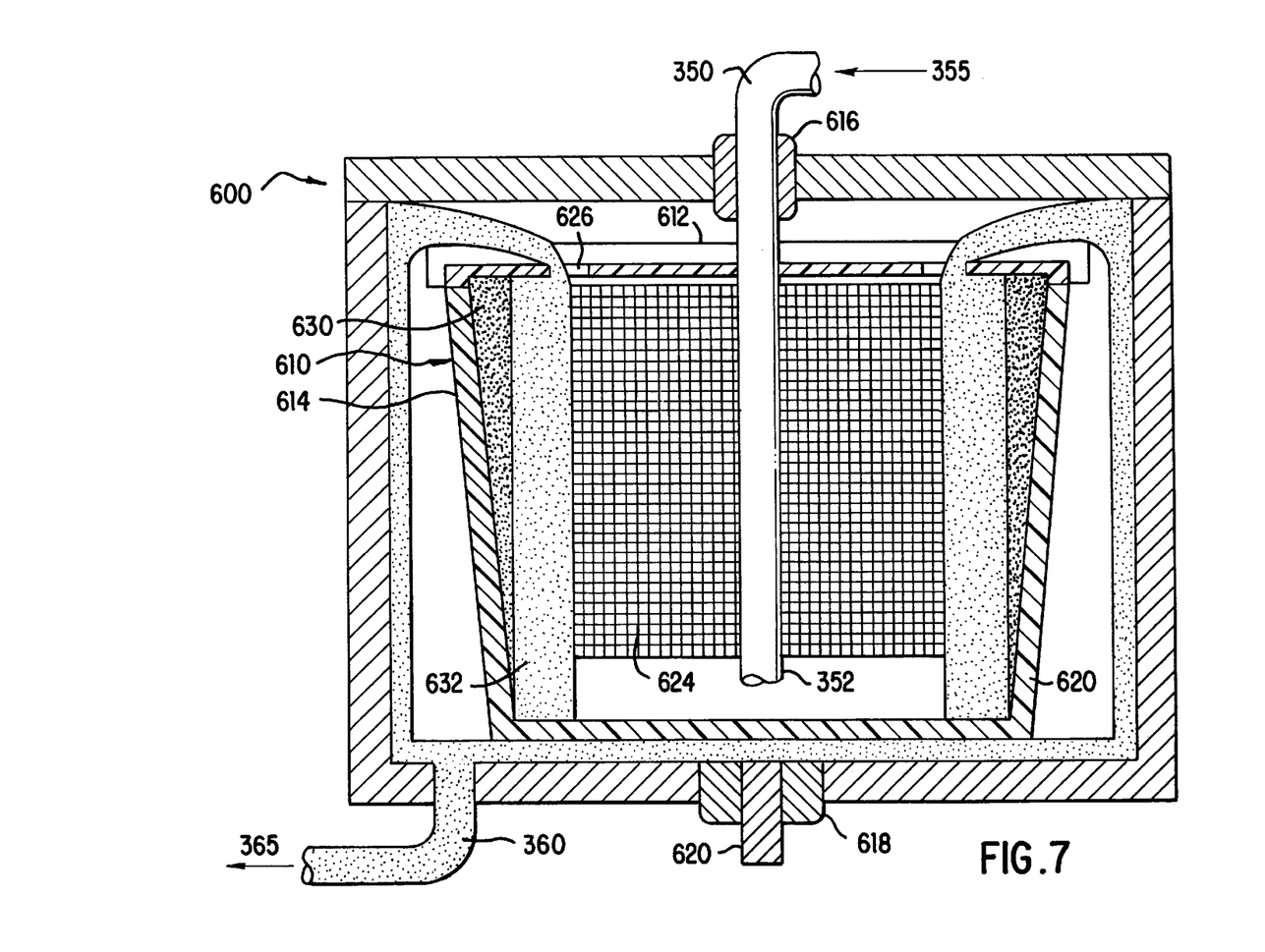
FIG. 7 is a view is like FIG. 6, with the centrifuge in operation.

Given the tapered configuration of the centrifuge bucket 620, as waste adheres to the bucket sides, it also rises up the bucket walls 620. Under the force applied to the waste, solid elements are separated from liquid elements. Liquid waste elements flow over the surface of the screen 624 more easily than the solid waste. Thus, during operation of the centrifuge 600, the solid waste elements are arranged to form a cylindrical layer 630 in contact with the screen 624. The liquid waste elements form a second cylindrical layer 632 in contact with the layer of solid waste. This is shown in FIG. 7.

If the quantity of waste is permitted to increase, the layer of liquid waste 632 reaches the holes 626 provided in the bucket lid 626. The liquid waste escapes from the centrifugal drum 610 via the holes 626 and the openings in the drum lid 612. Once free of the centrifugal drum 610, the liquid waste collects at a bottom of the centrifuge housing 602 and exits the centrifuge 600 via discharge tube 360.

The centrifugal bucket 620 retains solid elements of the waste indefinitely. In a preferred embodiment, the centrifuge bucket 620 is made of a low-cost plastic and contains handles for easy disposal.

Those of skill in the art will appreciate that human beings typically defecate approximately one time per day and urinate four times per day or more. Feces is less than 10% solids, the remainder being liquids. Further, toilets on mobile craft may add over a gallon of water to the waste per flush. Thus, a large portion of the waste treated by the system 100 is liquid.

In a preferred embodiment, the centrifuge bucket 620 holds one gallon which is sufficient capacity to accommodate the solid waste from approximately 250 flushes. The centrifuge bucket 620 may be used by an ultimate consumer as a throw-away consumable; the consumer discards and replaces the centrifuge bucket 620 at the conclusion of a predetermined interval, depending upon the frequency of users, e.g. six months on a boat continuously boarding four people.

The controller 700 maintains timing of events for operation of the system 100. When the system 100 is first turned on, the controller 700 applies power to the heater 514 provided in the heat reservoir 500. The controller 700 does not begin waste processing until the temperature of the heat reservoir 500 reaches approximately 160° F. When the temperature of the heat reservoir 500 reaches between 165°–175° F., the controller 700 allows waste 410 to be processed. The controller maintains the temperature of the heat reservoir 500 within the 165°–175° F. range whenever the system 100 is on, regardless of whether waste 410 is being processed. When the system 100 is not processing waste 410, the power consumption of the system is approximately 150 watts.

If the system 100 employs the second embodiment of the heat reservoir 500, the controller 700 keeps the agitator 550 on whenever the system 100 is on. The agitator 550 circulates the oil 544 to maintain a uniform temperature in the heat reservoir 500.

When the temperature of the heat reservoir 500 reaches 160° F., the controller 700 allows the system 100 to process waste 410. Should the temperature of the heat reservoir 500 ever drop below 160° F., the controller 700 disables the remainder of the system 100 and prevents any further waste processing. Waste processing will not resume until temperature of the heat reservoir exceeds 160° F. Even in an idle mode, toilets 210 can be used. Waste 410 will be stored in holding tank 400 until the temperature of the heat reservoir 500 exceeds 160° F.

Provided that the temperature of the heat reservoir 500 stays above 160° F., the controller 700 reads data from the level sensor 480 over the level sensor control lines 482. When the controller 700 receives a signal indicating that level of waste 410 in the holding tank 400 has reached the high level threshold, controller 700 begins waste processing. The controller 700 processes waste 410 until the level of waste 410 in the holding tank 400 reaches the low level threshold. The controller 700 then stops waste processing until the level of waste 410 in the holding tank again reaches the high level threshold.

FIG. 2 illustrates the waste 410 in contact with the low level sensor 486 and the probe 484. FIG. 2 represents one of two circumstances. In the first case, the pump 420 is operating pumping waste 410 through the untreated waste tube 310. The pump 420 remains in operation until the quantity of waste 410 drops past the low level threshold and the electric connection between the low level sensor 486 and the probe 484 is broken. Once the controller 700 senses that the connection between the low level sensor 486 and the probe 484 is broken, the controller 700 deactivates the pump 420 over the control line 434.

In the second case, the pump 420 is turned off. This occurs because the level of waste 410 had dropped below the low level threshold and the connection between the low level sensor 486 and the probe 484 had broken. Because the pump 420 is not activated, the controller 700 allows the quantity of waste 410 to rise even after the connection between low level sensor 486 and probe 484 is restored. The controller 700 allows the quantity of waste 410 to reach the high level threshold. At that point, a connection between the high level sensor 488 and the probe 484 is established and the controller 700 activates the pump 420 to pump waste 410 out through the untreated waste tube 310.

When the controller 700 enables waste processing, it activates the injector pump 420 or 460 to force a small quantity of waste 410 to the heat reservoir 500. The controller 700 allows each small quantity of waste 325 to sit in the heat exchanger 320 long enough to ensure that the temperature of the waste 325 has risen above the minimum required to kill the fecal coliform bacteria. The controller 700 then activates the pump 420 or 460 to pump new waste 325 into the heat exchanger 320. The controller 700 turns the pump 420 or 460 on for approximately 12 seconds and off for approximately 25 seconds to process successive batches of waste 325. The incremental pumping operation is continued until the level of the waste 410 in the holding tank 400 falls below the low level threshold. When the waste 410 drops below the low level threshold, the controller 700 ceases waste processing. Using this procedure, the system 100 may process about one pound of waste per minute.

When the system 100 sits idle for a long period of time, it is desirable to process substantially all of the waste 410 present in the holding tank 400 and to clean out the holding tank 400. Consumers should be instructed to flush a toilet 210 at least once to introduce about a gallon of fresh water to the holding tank 400. The fresh water dilutes the waste 410 and raises the level of the waste 410 above the high level threshold. The controller 700 will process the diluted waste 410, bring the level of waste 410 below the low level threshold, and clean out the system 100.

As part of the regulatory scheme governing waste systems on watercraft, 33 C.F.R. § 159 classifies craft as either Type I or Type II. Type I craft discharge both solid and liquid waste directly into the environment. In a Type I embodiment of the present invention, cooled waste 345 from the holding tank 400 travels through cooled waste conduit 350 through the boat hull 200 into the environment. The centrifuge 600 is not included in a Type I embodiment.

Type II waste systems must separate solid elements of waste from liquid waste. In a Type II embodiment of the present invention, solid waste 630 is separated from liquid waste 632. An invention satisfying this application further processes the cooled waste 345 by a centrifuge 600.

The above description and drawings are only illustrative of a preferred embodiment which achieves the objects, features and advantages of the present invention, and it is not intended that the present invention be limited thereto. Any modification of the present invention which comes within the spirit and scope of the following claims is considered part of the present invention.

What is claimed as new and desired to be protected by Letters Patent of the United States is:

1. A sewage treatment system for treating waste, comprising:
    a holding tank for holding the waste including:
        a holding tank housing,
        an injector pump mounted on said housing for pumping the waste through the system, and
        a holding tank outlet conduit in fluid communication with said injector pump;
    a fluid passageway in fluid communication with said holding tank, said fluid passageway having an outlet;
    a heater for heating the waste in said fluid passageway;
    a controller controlling said heater via a first control line and controlling said injector pump via a second control line;
    a temperature sensor positioned proximate to said heater, said temperature sensor transmitting temperature control signals to said controller via a third control line; and
    a timer for timing a heating cycle period;
    wherein said heater heats the waste in said fluid passageway during the heating cycle period, said controller preventing said injector pump from pumping waste through said system during said heating cycle period.

2. The sewage treatment system of claim 1, wherein said holding tank further comprises a heat exchanger tube in fluid communication with said fluid passageway outlet, wherein said holding tank exchanger tube receives heat from said fluid passageway outlet.

3. The sewage treatment system of claim 1, wherein said holding tank housing is provided with an upper and a lower portion, said lower portion defined by a sidewall tapering inwardly downwardly from said upper portion.

4. The sewage treatment system of claim 3, wherein said injector pump pumps the waste from said holding tank to said fluid passageway.

5. The sewage treatment system of claim 4, wherein said injector pump is a first macerator.

6. The sewage treatment system of claim 5, wherein said macerator is positioned in said lower portion of said holding tank.

7. The sewage treatment system of claim 6, wherein said holding tank further includes a waste level sensor electronically connected to said controller for sensing the level of the waste in said holding tank.

8. The sewage treatment system of claim 6, wherein said holding tank further includes a second macerator positioned in said lower portion of said holding tank.

9. The sewage treatment system of claim 8, wherein said holding tank further includes a waste level sensor electronically connected to said controller for sensing the level of the waste in said holding tank.

10. The sewage treatment system of claim 9, wherein during the heating cycle period, said first macerator is turned off and said second macerator is in operation.

11. The sewage treatment system of claim 1, further including a solid billet, said billet having a well for housing said heater, and said fluid passageway includes a groove.

12. The sewage treatment system of claim 11, wherein said groove is located on a circumference of said billet.

13. The sewage treatment system of claim 1, further including a heat reservoir for housing said heater, said heat reservoir being provided as a tank filled with a liquid, said fluid passageway being immersed in the liquid.

14. The sewage treatment system of claim 13, wherein the liquid is vegetable oil.

15. The sewage treatment system of claim 13, wherein the heater is immersed in the liquid.

16. The sewage treatment system of claim 13, further including an agitator that circulates the liquid throughout said holding tank.

17. The sewage treatment system of claim 1, wherein said holding tank further includes a waste level sensor mounted on said housing.

18. The sewage treatment system of claim 1, wherein said heat reservoir further includes a housing formed of an insulative material.

19. A sewage treatment system for treating waste, comprising:
    a holding tank for holding the waste including:
        a holding tank housing;
        an injector pump mounted in said housing for pumping the waste through the system; and
        a holding tank outlet conduit in fluid communication with said injector pump;
    a fluid passageway in fluid communication with said holding tank, said fluid passageway having an outlet;
    a heater adapted and positioned to heat the waste in said fluid passageway to a predetermined temperature;
    a temperature sensor positioned adjacent to said fluid passageway, said sensor adapted to generate a signal corresponding to said predetermined temperature; and
    a controller electronically connected to said temperature sensor and said injector pump, said heater and said injector pump responsive to predetermined signals;
    wherein said controller is adapted to activate said injector pump responsive to a signal transmitted by said temperature sensor corresponding to said predetermined temperature.

20. The sewage treatment system of claim 19, wherein at said predetermined temperature, there is an effective temperature of the waste sufficient to kill fecal coliform bacteria.

21. The sewage treatment system of claim 20, wherein said effective temperature is in a range of 165° F. to 175° F.

22. The sewage treatment system of claim 20, further including a heating medium, said fluid passageway and said sensor positioned in said heating medium.

23. The sewage treatment system of claim 20, wherein said controller is adapted to turn off said pump in response to a signal transmitted from said sensor corresponding to a second predetermined temperature, said second predetermined temperature being lower than said effective temperature.

24. The sewage treatment'system of claim 23, wherein said controller is adapted to turn off said pump at a predetermined time.

25. A system as in claim 19, wherein said sensor is positioned outside of said fluid passageway.

26. A system as in claim 19, wherein said sensor is positioned adjacent to said heater.

27. The system as in claim 19, wherein at least a portion of said fluid passageway is within a heat reservoir.

28. The system as in claim 27, wherein said sensor is positioned adjacent to said heater and outside of said at least a portion of said fluid passageway within said heat reservoir.

29. The system as in claim 28, wherein said heat reservoir is contained in a heat reservoir housing.

30. The system as in claim 29, wherein said heat reservoir housing is filled with an insulator.

31. The system as in claim 27, wherein said heat reservoir includes a heater well, said heater being provided within said heater well.

32. The system as in claim 27, wherein said heat reservoir includes a sensor well, said sensor being provided within said sensor well.

33. A sewage treatment system for treating waste, comprising:

a holding tank for holding said waste including:
  a holding tank housing;
  an injector pump mounted on said housing for pumping said waste through the system; and
  a holding tank outlet conduit in fluid communication with said injector pump;

a fluid passageway in fluid communication with said holding tank, said fluid passageway having an outlet;

a solid billet adjoining said fluid passageway and having at least one groove formed in its surface defining a conduit path of said fluid passageway; and a heater adapted to heat said billet;

wherein said waste is positioned along said conduit path in heat transfer relation to said groove, and wherein said fluid passageway includes a tube positioned along said conduit path to separate said waste from said billet.

* * * * *